No. 890,664. PATENTED JUNE 16, 1908.
T. LANGEN.
TROLLEY WHEEL.
APPLICATION FILED APR. 8, 1907.
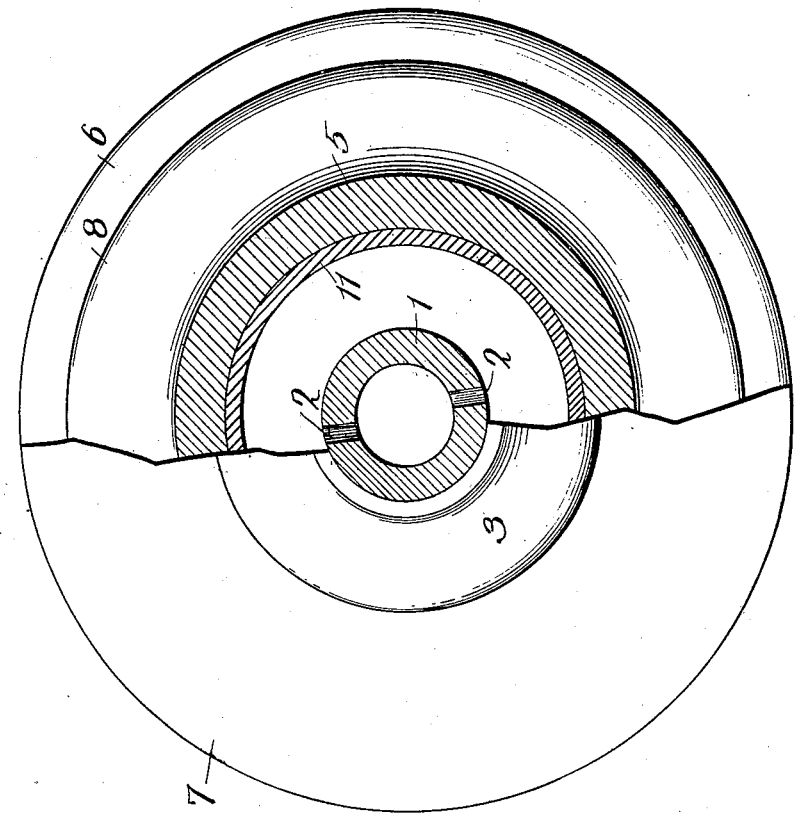
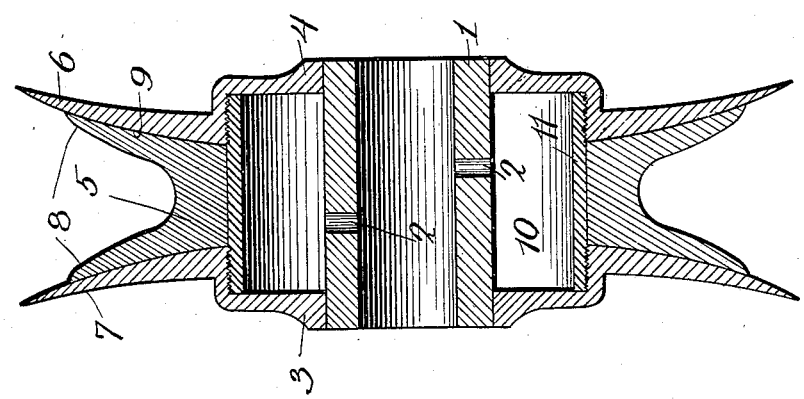
WITNESSES:
INVENTOR
Thomas Langen
BY
ATTORNEY

UNITED STATES PATENT OFFICE.

THOMAS LANGEN, OF BROOKLYN, NEW YORK.

TROLLEY-WHEEL.

No. 890,664.

Specification of Letters Patent.

Patented June 16, 1908.

Application filed April 8, 1907. Serial No. 366,899.

*To all whom it may concern:*

Be it known that I, THOMAS LANGEN, a citizen of the United States, residing at No. 835 Sixtieth street, Brooklyn, county of Kings, State of New York, have invented a new and useful Improvement in Trolley-Wheels, of which the following is a specification.

The object of this invention is to construct a trolley wheel in parts so that the parts getting the greatest amount of wear can be renewed and new parts inserted, thereby reducing the cost of maintaining trolley wheels in working condition. Also so constructing it as to admit of a large oil chamber and means for continuous lubrication.

In the accompanying drawing forming part of this specification, Figure 1 is a section through the diameter of the wheel. Fig. 2 is an elevation partly in section.

Like figures refer to like parts.

The wheel is formed of two side flanged portions marked 3 and 4 having recesses on the inner side and threaded in the recesses so as to screw on to a connecting tube 11. Fitted into the two sides is a tubular bearing 1 having oil passages 2 communicating with the space 10 between the tubular bearing 2 and the connecting tube 11. The wearing surface is a grooved circular piece 5 fitted onto the connecting tube 11, and having flanges 8 fitting in between flanges 6 and 7. This wearing surface can be made of one or more circular pieces forming a grooved ring.

The side flanges 6 and 7 can be made in separate pieces from the central portions 3 and 4 and the tubular part 11 can be integral parts of the side pieces 3 and 4, the essential features of the form and functions being retained.

Having described my invention what I claim and desire to secure by Letters Patent is:

1. In a trolley wheel, disk shaped side members, a separable tubular member between the side members and adapted to connect them together, a member forming a bearing for the axle, an oil space between the tubular member and the bearing member, and a member surrounding the tubular member forming a renewable wearing surface.

2. In a trolley wheel, side members shaped so as to admit of a female screw thread in each side, a tubular member threaded at each end and adapted to connect the side members by the screw thread, a bearing member, a space between the tubular member and the bearing member.

3. In a trolley wheel, similar side members, a connecting member adapted to screw into each of the side members, a member forming a wearing surface outside of the connecting member.

THOMAS LANGEN.

Witnesses:
E. N. ROBER,
J. W CROMWELL.